(No Model.) 2 Sheets—Sheet 1.
D. MASON.
CONTROLLING ELECTRIC MOTORS.
No. 551,470. Patented Dec. 17, 1895.
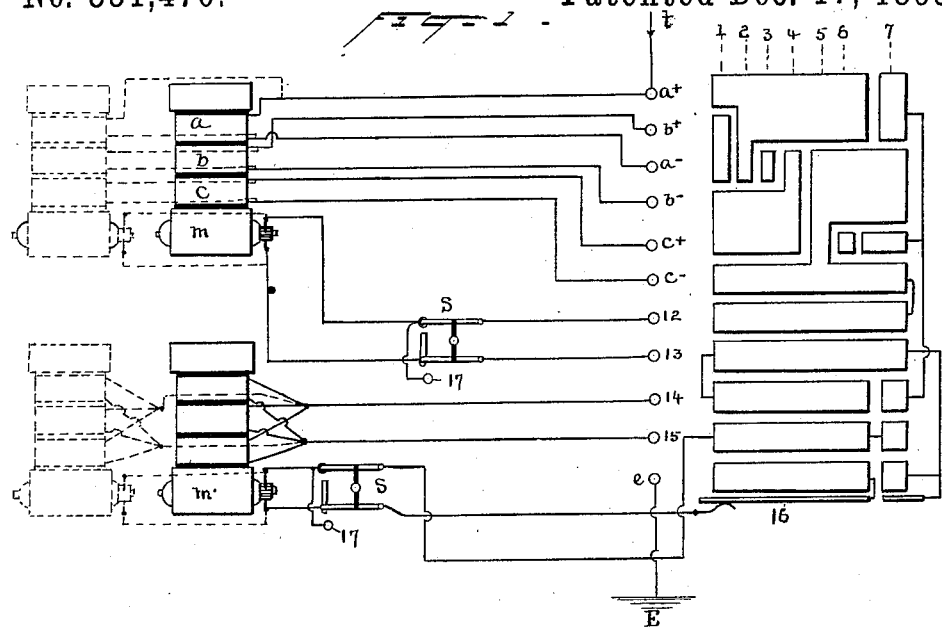
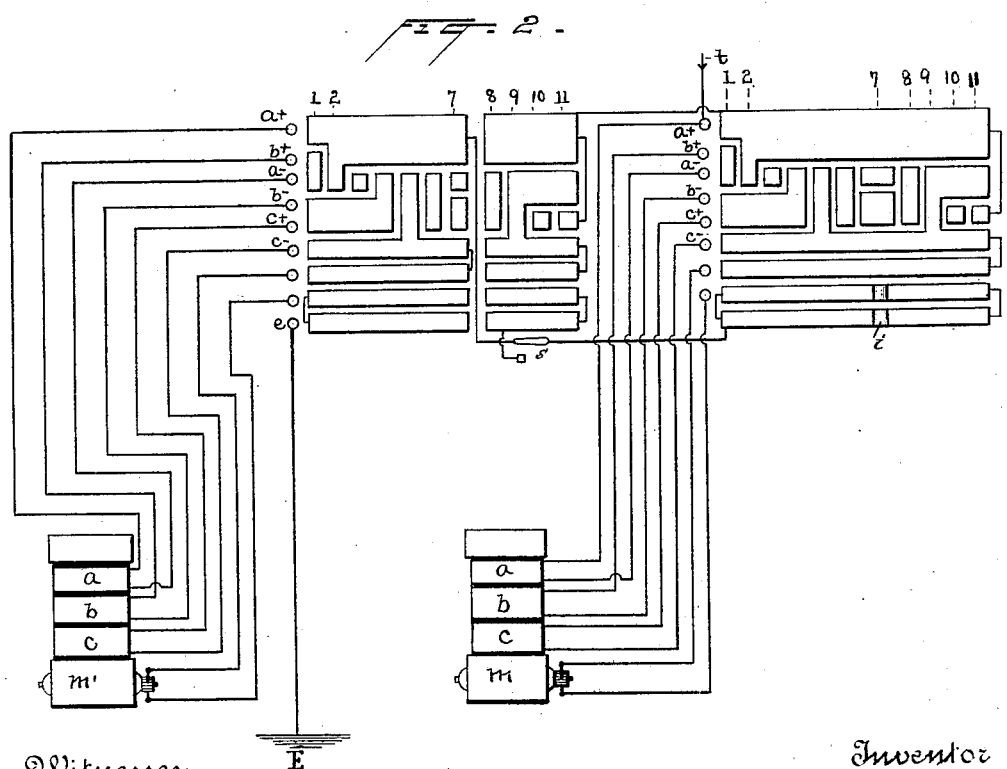
Witnesses
Norris H. Clark.
N. F. Oberly
Inventor
D. Mason
By his Attorneys
Dyer & Seely

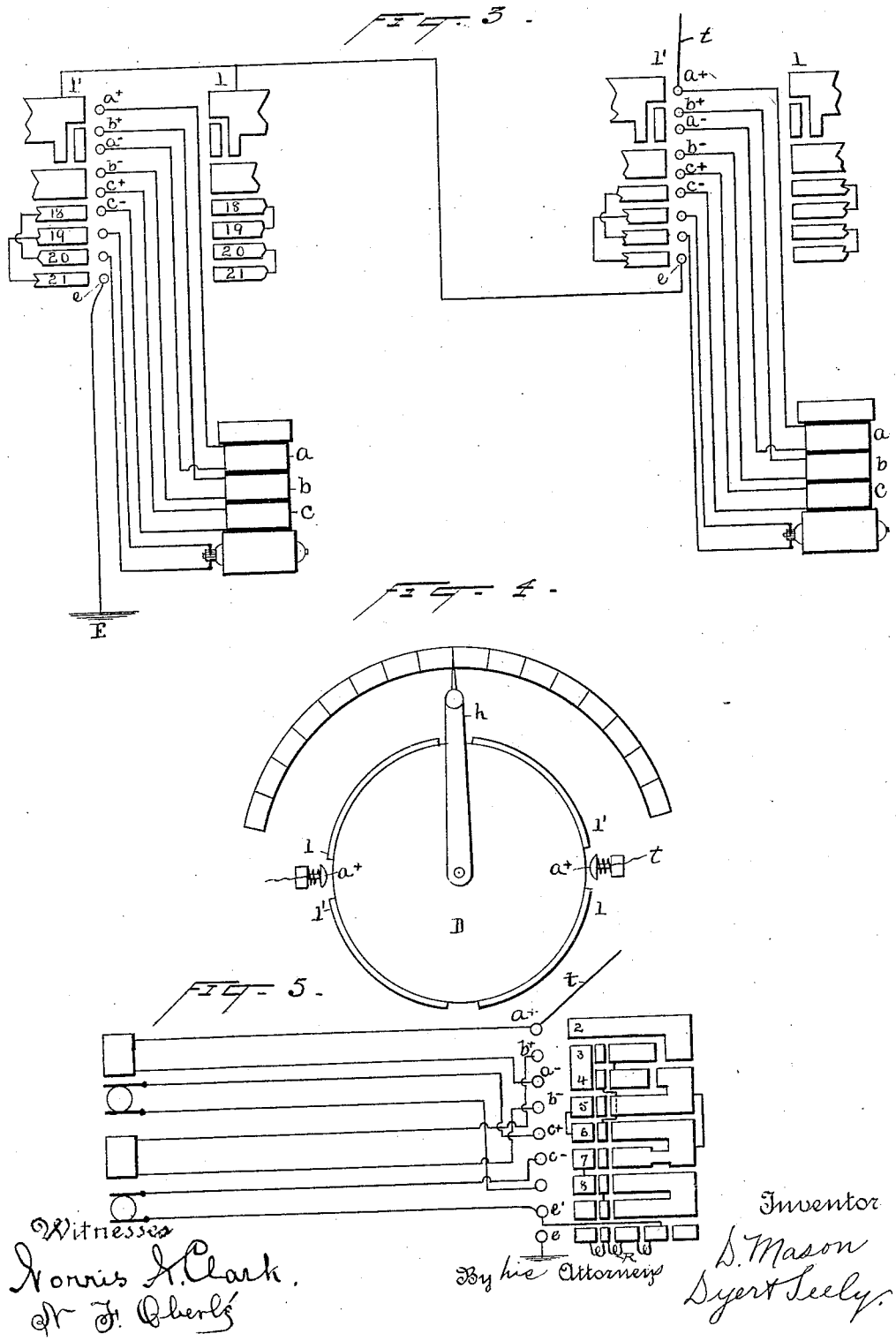

UNITED STATES PATENT OFFICE.

DAVID MASON, OF SCHENECTADY, NEW YORK, ASSIGNOR TO THE GENERAL ELECTRIC COMPANY, OF NEW YORK.

CONTROLLING ELECTRIC MOTORS.

SPECIFICATION forming part of Letters Patent No. 551,470, dated December 17, 1895.

Application filed April 22, 1892. Serial No. 430,191. (No model.)

*To all whom it may concern:*

Be it known that I, DAVID MASON, a citizen of the United States, residing at Schenectady, county of Schenectady, and State of New York, have invented a certain new and useful Improvement in Controlling Electric Motors, of which the following is a specification.

The present invention relates to controlling several electric motors simultaneously in such manner that the load shall be started gradually and with perfect safety to the motors, and my object is to accomplish this without the use of large idle artificial resistance.

The invention consists in providing several motors, each of which has one or several field-magnet coils, connecting the motors in series in such manner that one of the motors or one group of motors acts as a "starter" or as a resistance to the other motor or motors, and commutating the coils of the starter motor or motors in such manner as to gradually reduce their resistance, and finally connecting the motors in multiple arc with the coils of the starter motor or motors, and preferably of the other motors, also in multiple arc. In one form of the invention the second motor or group of motors may be provided with one or with several field-magnet coils, but in either case the connection is permanent—that is, the coils of the second motor or motors are not connected first in series and then in multiple, but the connection always remains the same. In a second form both motors or the motors of both groups are provided with several coils and are changed from series to multiple, &c., simultaneously. Provision is also made for reversing the motors. This may be done by a switch separate from the controlling-switch, or it may be done by the controlling-switch itself.

The invention comprises also several other features hereinafter more fully described, and pointed out in the claims.

In the accompanying drawings, Figures 1, 2, 3, and 5 are diagrammatic views of three systems embodying the invention; and Fig. 4 is a plan view of the switch-drum, showing the arrangement of contacts thereon in the system illustrated in Fig. 3.

Referring first to Fig. 1, $m$ $m'$ are motors—for example, the propelling-motors on an electric car. At the right of the figure is shown a developed switch, which may be employed to change the several circuit connections. The form of the several contact-plates of the switch and the connections thereof will be clear without specific description. The circles $a^+$ $b^+$ $a^-$ $b^-$, &c., represent contact-brushes or devices adapted to make contact with the contact-plates of the switch, said parts being movable in relation to each other. In this figure each motor is provided with three field-magnet coils $a$ $b$ $c$, the positive and negative terminals of each coil being connected to switch-brushes with corresponding reference-letters. The armature of the upper motor is connected to brushes 12 13, and the several coils of the lower motor field-magnet are connected in multiple arc to the two brushes 14 15. The lower brush $e$ is connected to earth E. On the lower end of the switch-body is mounted a metal plate or ring 16, against which a brush constantly bears, and to this brush one of the lower armature terminals is connected. The trolley or supply wire $t$ is connected to the upper brush $a^+$. When the switch is moved to bring the brushes $a^+$, &c., into contact with the switch-plate on a vertical line through 1, all the coils of motor $m$ will be in series, and said motor will be in series with motor $m'$. When moved to position 2, coil $a$ of the first motor will be short-circuited, and when moved to position 3 said coil will be open. When moved to position 4, coils $a$ $b$ will be in multiple arc and these will be in series with $c$. When moved to position 5, coils $a$ and $b$ will be in multiple arc and $c$ short-circuited. When moved to position 6, coils $a$ $b$ will be in multiple arc and $c$ open, the motors to this point being maintained in series. When the switch is moved to position 7, $a$, $b$, and $c$ of the first motor will be thrown into multiple arc, and at the same time the two motors will be thrown into multiple arc, thereby giving the greatest possible power to the machines. It is evident that some of these commutations of the coils may be omitted if great flexibility of the system is not required.

As thus far described, it has been assumed that two motors only were to be controlled, and that one of these was employed as a starter for the second. Evidently I may employ a group of motors as starters for another motor, or for other motors, and in Fig. 1 are shown in dotted lines two additional motors, the first two being connected to form a group controlled simultaneously by the switch, and the lower two motors being connected to form a second group through which the current is conducted after passing through the first motors. Evidently other circuit connections and other numbers of motors could be employed.

As above described, the controlling-switch has no provision for reversing the motors. To provide means for accomplishing this, reversing-switches S S are, or may be, placed in the two armature-circuits. When it is desired to turn the motors in the opposite direction, these switches are moved so that the lower arm of each switch will rest on contact 17. These switches are preferably, though not necessarily, placed where they can be operated by the man in charge of the controlling-switch.

In Fig. 2 the parts are designated so far as possible to correspond with Fig. 1. In this figure there are two series of switch-brushes and two series of switch contact-plates instead of one, as above described, and the coils of the second motor $m'$ are connected to one series of brushes, and the coils of the motor $m$ to the brushes of the other series. As the switch is moved to position 1, all the coils of both motors will be thrown in series. As the switch is moved along, several commutations will be made, and when the switch reaches position 7 coils $a$ of both motors will be open and coils $b$ $c$ of both motors will be in series. As the switch now moves to position 8, $a$ and $b$ will be thrown into multiple arc and into series with $c$, and when the switch reaches position 11 the coils $a$ $b$ $c$ of each motor will be thrown into multiple arc with each other, and the two motors will be thrown into multiple arc, thus giving the maximum power, and the change will be made without bad sparking. In this form, as in the preceding, the first motor serves as a starter for the second, the connections being such as to give at starting a considerable resistance, which resistance is gradually reduced as additional power and speed are required while the motors are in series, and finally all the coils, as well as the motors, are thrown into multiple arc, and all these commutations are produced by a simple movement of a switch, it being understood that the contact-plates of the switch are preferably mounted on a suitable body, such as a drum D, Fig. 4, beside which the switch-brushes are stationary, or the brushes being movable and the drum stationary. This arrangement enables me also to throw one of the motors out of use and to operate the other alone—for example, by providing a switch $s'$ in the line connecting the two switch-sections. Thus if an accident occurs to one motor it does not disable the car or stop the machinery being driven.

Of course it is not essential that both series of contact plates and brushes illustrated in Fig. 2 should be on or adjacent to a single switch-body, but this is preferable, and it is especially desirable that a single operating-handle only be required. At certain points on the switch—for example, where the connection is changed from series to multiple—it is advisable to provide means for opening the circuit of one motor before it is put in multiple with other motors to prevent arcing or short-circuiting. Such means are indicated by the rounded insulating-ribs $i$, over which the brushes may ride and by which they are prevented from making a short circuit between the series and multiple-arc contact-plates.

In Fig. 3 is indicated an arrangement by which the motors can be connected and the coils commutated, as in Fig. 2, by moving the switch in one direction, and by which the motor-coils can be similarly commutated, but the current through the armatures being reversed, to reverse direction of movement of the motor, by moving the switch in the opposite direction, this reversal being effected by connecting the contact-plates 18 20 and 19 21 on one side of the brushes and the plates 18 19 and 20 21 on the other side. The positions which the switch-brushes first occupy when the switch is moved to start the motors are indicated by 1 1′, the former being at the right of the brushes and the latter at the left.

In Fig. 4 is shown a plan view of a switch-drum having the contact-plates arranged in four sections or series, separated by spaces, in two of which spaces the contact-brushes $a^+$, &c., stand. The numerals 1 1′ on this figure indicate lines corresponding to the positions 1 1′ of the switch above described. $h$ is a handle for moving the drum. The motors shown are diagrammatic merely, the invention not being limited to any particular construction of motor.

In Fig. 5 each of the motors illustrated has but one field-magnet coil. By tracing the circuits through the switch when moved to make contact on lines 1 to 5 consecutively it will be found that all coils of both motors are first connected in series, then one machine is cut out, then the two field-coils are connected in series and the armatures in multiple arc. The next move opens the field of one motor and the final move throws the two field-coils and the two armature-coils into multiple arc, the circuit being maintained closed while the changes are being made. By making the changes as described, arcing is reduced to a minimum. The contacts of the switch are preferably so arranged that the motor which is thrown out of circuit at one point is short-circuited for an instant just before it is cut out. In this figure is shown also an artificial resistance R, connected to switch-plates, and over which brush $e$ is adapted to move at the same time that $a^+$, &c., move over their contact-plates. Thus the motors are controlled by simultaneously commutating the coils and throwing out resistance. The resistance reduces sparking as the coils are commutated. It also makes it necessary for the operator to move the switch along a considerable distance, placing the coils in a condition of high efficiency, before a high speed is attained. It will be evident that the resistance R may be used in connection with the circuits of the other diagrams, as well as with the circuits of Fig. 5.

What I claim is—

1. The improvement in controlling two or more electric motors, which consists in providing the field of one of said motors as a starter with two or more independent coils, in connecting the coils of said starter in series with each other with the starter armature and with the other motor or motors; then in short circuiting one of said coils; then in connecting said coils in multiple with each other but in series with the starter armature and with the other motor or motors; and finally in connecting said coils and the starter armature in multiple with the other motor or motors, substantially as set forth.

2. The improvement in controlling two or more electric motors, which consists in providing the field of one of said motors as a starter with two or more independent coils, in connecting the coils of said starter in series with each other with the starter armature and with the other motor or motors; then in short circuiting one of said coils; then in open circuiting the same coil; then in connecting said coils in multiple with each other but in series with the starter armature and with the other motor or motors, and finally in connecting said coils and the starter armature in multiple with the other motor or motors, substantially as set forth.

3. The combination of two or more electric motors, one of which as a starter is provided with two or more sets of independent field coils; a brush for each terminal of the circuits of said coils, the armature of said motors and the field or fields of the other motor or motors; and a switching device provided with contact plates thereon co-operating with said brushes and which when moved with respect to said brushes serve first to connect the coils in series with each other, with the starter armature and with the other motor or motors; then to short circuit one of said coils; then to connect said coils in multiple with each other but in series with the starter armature and with the other motor or motors, and finally to connect said coils and the starter armature in multiple with the other motor or motors, substantially as set forth.

4. The combination of two or more electric motors, one of which as a starter is provided with two or more sets of independent field coils, a brush for each terminal of the circuits of said coils, the armatures of the motors, and the field or fields of the other motor or motors; and a switching device carrying contact plates with which said brushes co-operate and which when moved serve first to connect said coils in series with each other with the starter armature and with the other motor or motors, then to short circuit one of said coils; then to open circuit the same coil; then to connect said coils in multiple with each other but in series with the starter armature and with the other motor or motors, and finally to connect said coils and the starter armature in multiple with the other motor or motors, substantially as set forth.

5. The combination of two or more electric motors, a series-multiple switching device for controlling said motors; and means for opening the circuit of the armature of one motor while the connections are changing from series to multiple arc, substantially as set forth.

6. The combination of two or more electric motors, a series-multiple switching device for controlling said motors, and insulated ribs carried by said switching device for opening the circuit of the armature of one motor while the connections are changing from series to multiple arc, substantially as set forth.

This specification signed and witnessed this 15th day of April, 1892.

DAVID MASON.

Witnesses:
THEO. E. BUTTON,
GEO. C. REILLEY.